United States Patent
Carkner et al.

[11] Patent Number: 6,047,055
[45] Date of Patent: *Apr. 4, 2000

[54] NUMBER PORTABILITY WITH DATABASE QUERY

[75] Inventors: R. William Carkner; L. Lloyd Williams, both of Kanata, Canada

[73] Assignee: Stentor Resource Centre, Inc., Ottawa, Canada

[*] Notice: This patent is subject to a terminal disclaimer.

[21] Appl. No.: 08/774,964

[22] Filed: Dec. 26, 1996

Related U.S. Application Data

[63] Continuation of application No. 08/578,976, Dec. 27, 1995, Pat. No. 5,602,909.

[30] Foreign Application Priority Data

Dec. 21, 1995 [CA] Canada .................................. 2165856

[51] Int. Cl.[7] .............................. H04M 3/42; H04M 3/54; H04M 7/00; H04J 3/12
[52] U.S. Cl. ......................... 379/207; 370/385; 379/211; 379/220; 379/224; 379/230
[58] Field of Search .................................. 379/201, 207, 379/211, 219, 220, 222, 224, 229, 230; 370/385

[56] References Cited

U.S. PATENT DOCUMENTS

| | | | |
|---|---|---|---|
| 5,598,464 | 1/1997 | Hess et al. ........................... | 379/230 X |
| 5,602,909 | 2/1997 | Carkner et al. ...................... | 379/230 X |
| 5,793,857 | 8/1998 | Barnes et al. ........................... | 379/207 |

FOREIGN PATENT DOCUMENTS

| | | | |
|---|---|---|---|
| 0550180 | 7/1993 | European Pat. Off. ........... | 379/220 X |
| 9526114 | 9/1995 | WIPO . | |

OTHER PUBLICATIONS

Nortel, Document Number T1S1.3/95–95–11103, "Look–Ahead Option for Local Number Portability", 4 pages, dated Nov. 8, 1995.

XV International Switching Symposium, vol. 2, Apr. 23–28, 1995, Berlin DE, pp. 97–101, XP 000495633, Folkestad et al, "Impact of UPT services on network performance and call set–up times: Distribution of UPT service logic in SS7".

Ericsson Review, vol. 70, No. 4, 1993, Stockholm SE, pp. 156–171, XP000415352, Soderberg, "Evolving an intelligent architecture for personal telecommunication".

IEEE Communications Magazine, vol. 33, No. 6, Jun. 1995, New York US, pages 76–86, XP000545328 Laitenen et al, "Integration of Intelligent Network Services into Future GSM Networks".

43rd IEEE Vehicular Technology Conference, May 18–20, 1993, Secaucus, NJ, US, pp 696–9, XP000393278 Ashitey et al: "Intelligent Personal Communication System".

*Primary Examiner*—Harry S. Hong
*Attorney, Agent, or Firm*—Cobrin & Gittes

[57] ABSTRACT

A method of providing number portability for the treatment of calls from a calling party to a specific number of a called party is disclosed. An Initial Address Message (IAM) containing the calling and called party's numbers to enable said call to reach said terminating office is forwarded from an originating office to a terminating office. Once the IAM is received at the terminating office, a determination of whether the call is directed to a portable number is made. If the call is directed to a portable number, a release message containing an indication that the called party number is a portable number is forwarded from the terminating office to the originating office. Once the release message is received at the originating office, a TCAP query is launched from the originating office to an SCP if said release message contains an indication that the called party number is a portable number. At the SCP, the called party number is translated to obtain new routing information. A new IAM is then sent from the originating office to a terminating office associated with the new routing information.

36 Claims, 4 Drawing Sheets

NUMBER PORTABILITY WITH DATABASE QUERY

This is a Continuation of application Ser. No. 08/578,976, filed Dec. 27, 1995 and issued as U.S. Pat. No. 5,602,909 on Feb. 11, 1997.

SUMMARY OF THE INVENTION

This invention relates to telephone networks, but more particularly, to a method and system for providing number portability using IN database query.

BACKGROUND OF THE INVENTION

Although efforts are being made to solve some of today's network transparency constraints, the solutions offered are still constrained by the rigid rules of today's North American Numbering Plan (NANP) and the architecture which supports it. That is, each telephone subscriber has a number in the NXX-NXX-XXXX format, where N represents a digit from 2–9 and X represents a digit from 0–9. The first group of three digits indicates the area code or NPA of thee subscriber, the second group of three digits indicates a switching exchange or service switching point to which the subscriber is connected, and the last four digits indicates the address of the subscriber within the service switching point. Digits 0 and 1 are of course not available as the first digit (N) to allow operator and long distance services.

With the large increase in telephone devices of one sort or another, an equivalent increase in the demand of telephone numbers has been created. For example, 15 years ago, most telephone numbers were used or fixed Plain Ordinary Telephone Service (POTS) devices. Today, more and more users make use of several devices, such as cellular telephones, pagers, fax machines, modems, etc. This demand has placed a large impact on the pool of numbers available for customers. In some instances, metropolitan area that used to be served by one area code, now require several. The problem is of course compounded by the need to assign new telephone numbers to subscribers which move from one region to another. In addition, numbers must, in future, be portable between networks, namely between the Incumbent Local Exchange Carriers (ILEC) and Competitive Local Exchange Carriers (CLEC).

To help reduce this need for new numbers, network facilitators have been unsuccessfully researching options for delivering a service in which telephone numbers are not tied to equipment locations.

New telephone networks with Advanced Intelligent Network (AIN) concepts have been proposed to support faster development of new services through a network architecture in which network functions and interfaces are standardized providing greater independence between service software and technology.

One service application which makes use of AIN technology for separating dialling from physical routing is Local Number Portability (LNP). The applications are being examined by the Information Industry Liaison Committee (IILC) for extension LNP concepts. Many options have been discussed and are being investigated. The options to route based on network number ownership fall short, in the sense that they impose various limitations, and are at this time unworkable.

The current direction for network evolution is to remove intelligence from the telephone exchange using database query procedures to increase network flexibility. Where initial decisions can be made for launching a query to a database, increased flexibility can be easily obtained, usually with reduced costs. However, the costs increase dramatically when all calls from a specific exchange require this procedure. Costs associated with the database query implementation include:

- AIN and/or vendor license charges (usually on a per dip basis);
- Increase in exchange CPU requirements (factor of 2–5 per call);
- Augment of the signalling network;
- Database infrastructure required to support queries; and
- Database updates to keep all systems current.

Number portability requires the treatment of all calls to a specific number irrespectve of the point of origin, making the terminating switch the most logical location to control the call. Initially, this concept presents an inexpensive option for allowing portability, but as the numbers increase, many additional circuits will be required. At this point, release link trunks can be employed to reduce the connections, but this requires a common protocol and significant interconnection development.

Most solutions carry significant development requirements and it is therefore important to choose the option which can support the requirements over the long term.

Two options are the most widely recognized and popular at present. The first is to use AIN technology to use a query and response procedure for each call to query a database to establish number ownership. The second option is that of Terminating Switch Routing. This proposal consists of the routing of calls using the existing NANP to the expected terminating switch location where, when numbers are owned by another network, calls are then route advanced to that network. In some cases, release link trunks are envisioned to reduce the number of circuits required.

Some problems still exist in implementing these proposed methods, including flash cuts, calls being routed several times between networks and inefficient routing schemes. In addition, the solutions proposed above, are meant to make use of AIN technology. Although AIN is considered a subset of intelligent Networks (IN), number portability should not be limited to AIN networks only.

A need therefore exists for providing a mechanism to take advantage of these various methods while providing the flexibility to eliminate single option constraints.

It is therefore an object of the present invention to provide number portability which overcomes the aforementioned problems.

Another object of the present invention is to provide a method of routing calls between networks with ported numbers while making use of existing facilities, minimizing call routing complexities and costs.

Another object of the present invention is to provide a method of routing calls to provide number portability, which makes use of the flexibility provided by ISUP signalling, and more particularly, the release messages.

Another object of the present invention is to provide number portability by launching a database query only for those calls which are routed to directory numbers determined to be portable at the terminating office.

Yet another object of the present invention is to provide a method of providing number portability by modifying the release with cause parameter in a release message transmitted from the terminating switch, when the directory number is determined to be portable.

In accordance with—first aspect of the present invention, there is provided, in a telephone network having a number of telephone switching offices equipped with SSPs (Service Switching Points) operating with IN (Intelligent Network) application software, and a remotely located SCP(Service Control Point) adapted to receive, when required, SS7 (Signalling System 7) messages from the SSPs to translate a dialled number to enable the routing of a call on the telephone network, a method of providing number portability for the treatment of calls from a calling party to a specific number of a called party, comprising the steps of:

a) forwarding an Initial Address Message (IAN) from an originating office to a terminating office, said IAM containing the calling and called party's numbers to enable said call to reach said terminating office;
 b) receiving said IAM at said office and determining whether said call is directed to a portable number;
 c) returning from said terminating office to said originating office, a modified SUP message containing an indication that the called party number is a portable number, if said call is directed to a portable number;
 d) receiving, at said originating office, said modified ISUP message;
 e) triggering a TCAP query from said originating office to said SCP if said modified ISUP message contains an indication that said called party number is a portable number;
 f) translating, at said SCP, said called party number to an alternate routing number;
 g) receiving said alternate routing number at said originating office; and
 h) forwarding a new IAM to a terminating office associated with said alternate routing number.

In accordance with another aspect of the invention, there is provided in a telephone network having a number of telephone switching offices equipped with SSPs (Service Switching Points) operating with IN (Intelligent Network) application software, and a remotely located SCP(Service Control Point) adapted to receive, when required, SS7 (Signalling System 7) messages from the SSPs to translate a dialled number to enable the routing of a call on the telephone network, a method of providing number portability for the treatment of calls from a calling party to a specific number of a called party, comprising the steps of:

a) receiving digits dialled by said calling party at an exchange serving said calling party;
 b) establishing a signalling path from said exchange serving said calling party to a terminating exchange associated with the dialled digits;
 c) receiving an Initial Address Message (IAM) at said terminating exchange and determining whether said call is directed to a portable number;
 d) creating at said terminating office, a modified ISUP message containing an indication that the called party number is a portable number, if said call is directed to a portable number;
 e) determining whether the next switching office along the signalling path from said serving exchange to said terminating office is capable of supporting number portability;
 f) sending said modified ISUP message from said terminating office the next switching office along said signalling path, if said next switching office is able to service the call;
 g) launching a query to said SCP if he next switching office is unable to service the call, said SCP providing a routing option to enable said call to be routed to said called party;
 h) receiving said routing option at said switching office; and
 i) creating a new IAM to enable the call to reach the called party.

BRIEF DESCRIPTION OF THE DRAWINGS

In order to impart full understanding of the manner in which this object and others are attained in accordance with the present invention, preferred embodiments thereof will be described hereinafter with reference to the accompanying drawings wherein.

In the following description and the drawings, the same reference numerals will refer to the same structural elements.

DESCRIPTION OF THE PREFERRED EMBODIMENTS

In order to lighten the following description, the following acronyms will be used:
ACM: Address Complete Message;
AIN: Advanced Intelligent Network;
ANM: Answer Message;
CCS7: SS7 network signalling;
IAM: Initial Address Message;
IN: Intelligent Network;
ISDN: Integrated Services Digital Network;
ISUP: ISDN User Part;
POTS: Plain Ordinary Telephone System
PSTN: Public Switching Telephone Network;
REL: Release Message;
RLC Release Complete;
SCP: Signalling Control Point;
SSP: Service Switching Point;
STP: Signalling Transfer Point;
SUS: Suspend Message;
TCAP: Transaction Capabilities Application Part.

As indicated above, AIN is considered a subset of IN. However, for the purpose of the present invention, IN will be used hereinafter, even though the solutions offered here are applicable to AIN as well.

A typical SS7 network consists of signalling links and nodes. SS7 nodes are referred to as signalling points (SP) and are interconnected by signalling links. Each SS7 signalling node is assigned a unique point code, serving as the network address for message routing. SS7 signalling nodes include signalling Points (SP), service switching points (SSP), service control points (SCP) and signal transfer points (STP).

Signalling points (SP) are capable of sending and receiving SS7 messages with other SS7-equipped telephone offices, and routing calls based on the information exchanged. Incoming messages are formatted and transferred to the relevant processing function in the switch. Outgoing messages are transmitted over the signalling links.

Service switching points (SSPs) are Signalling Points (SP) further equipped to halt call progress, launch an SS7 query to obtain additional routing information from an SCP, and then route or treat the call based on the information received in the SCP's response. SSPs interact with databases to provide services and routing.

Service control points (SCP) are often referred to as SS7 services databases. One or more SCPs can serve as a central intelligence point in the network for enhancing how and if calls are to be routed through the network. Queries and responses to and from the SCP are carried over SS7 signalling links in the form of packet messages.

Signal transfer points (STP), are special SS7 nodes which provide a message switching function between other nodes and a SS7 network. Acting as a packet switch, it examines incoming messages and then routes them over the appropriate signalling link to the proper destination switching offices and databases. In this particular function, it supports end-to-end signalling, i.e. In transit (local, tandem and toll) connections, required for transaction messaging used for special services. Unlike other SS7 nodes, the STP does not generally act as a source or sink for SS7 messages.

Figure 1:
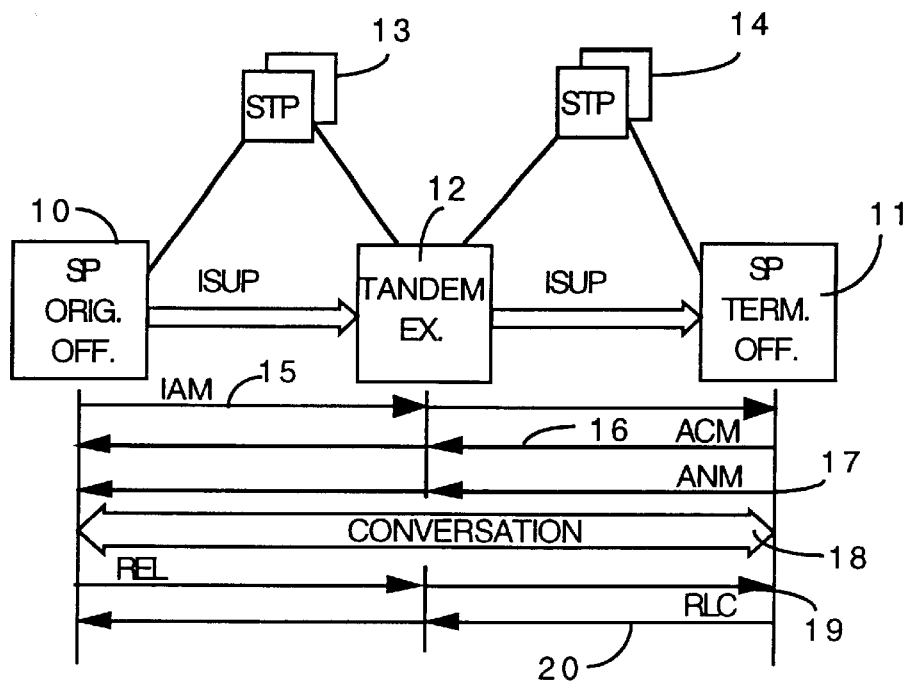
FIG. 1 is a diagram illustrating generally the basic signalling call flow between an originating and a terminating office.

Referring now to FIG. 1, we have shown a flow diagram which is used for providing an understanding of ISUP (Integrated Services Digital Network (ISDN) User Part) call progression. Signalling Transfer Points (STPs) have been shown but are usually transparent to ISUP signalling.

The message purposes are defined as follows:

Initial Address Message 15 (IAM): Indicates a request to each subsequent exchange for call set-up and to reserve the indicated trunk. Call connection will not be completed until the status is returned indicating the call path has been confirmed and the dialled number exists and is idle. The IAM contains information about both the calling and called parties.

Address Complete Message 16 (ACM): Indicates to the originating exchange that the call path has been confirmed and the dialled address exists and is idle.

Answer Message 17 (ANM): Returned by the terminating exchange once the call has been answered. Both directions of the call path are established at this time.

Release Message 19 (REL): Sent by the originating office to indicate that the originating party has terminated the call.

Release Complete 20 (RLC): Indication from the terminating exchange that the release message has been received and all connections have been terminated. The RLC can be considered as an acknowledgement of a REL message and the circuit being taken down.

Suspend Message (SUS): Sent by the terminating exchange where the called party terminates a completed call prior to the calling party going on-hook. The Terminating office sends a REL message when it has not been able to set up to the called party. SUS messages are supported in the TR317 Bell Core protocol, but not supported in most SS7 ISUP signalling standards. REL messages are used in those cases.

In the call scenario of FIG. 1, the call flow illustrates signalling which takes place during the call set-up and take-down of the call between originating office 10 and terminating office 11, via tandem exchange or intermediate office 12. After the calling party has picked up the receiver and received a dial tone, dialled digits are received at the originating switch 10. The first message sent during ISUP signalling call set up is an Initial Address Message 15 (IAM), which is created and sent from an originating office 10 to a tandem exchange 12 and re-created at tandem exchange 12 and forwarded to terminating office 11. The STP pairs 13 and 14, as indicated above, have been shown but are usually transparent to ISUP signalling. The IAM message 15 passes information about the call to all subsequent offices in the path. The IAM reserves a voice path while verifying the availability of the destination station, at the far end, i.e. terminating office 11. An Address Complete Message (ACM) 16 then sends confirmation that the dialled address both exists and is idle. Where the far end is available, a call path is established. Once the called party answers, an answer message (ANM) 17 is then returned to the originating office 10 and the conversation 18 then begins.

Call termination can be initiated from either the originating office 10 or the terminating office 11. Most ISUP protocols make use of release messages in either direction, for example, REL message 19 of FIG. 1. A release complete message (RLC) 20 is then returned, in this case, from the terminating office 11 to the originating office 10, indicating that all circuits have been returned to the available resource pool.

Figure 2:
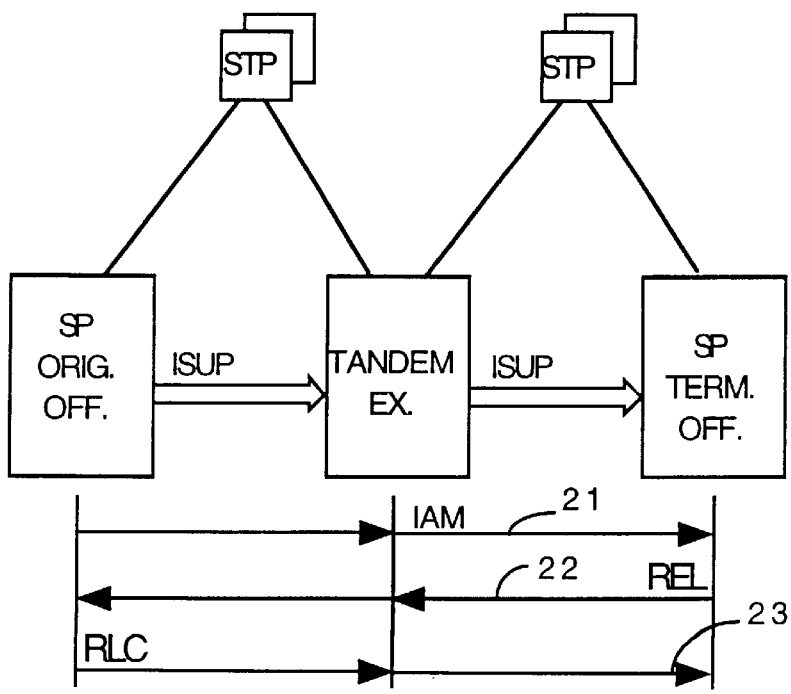
FIG. 2 is a diagram illustrating generally the basic signalling call flow between an originating and a terminating office when the destination station is not available.

Although ISUP protocols make use of release messages in either direction, Bell Core's TR 317 protocol requires that a Suspend message (SUS) be sent when the terminating party hangs-up first.

Where the call is not answered, the sequence of messages changes following the IAM. This is illustrated in the flow diagram of FIG. 2. Again, the first message sent during the ISUP signalling call set up is the Initial Address Message 21. However, instead of returning the ACM, such as in FIG. 1, when the IAM 21 is received at the terminating office, a release with cause message 22 is sent back to the office which originated the IAM while releasing the reserved call path in each tandem or intermediate office, followed by the release complete (RLC) message 23. Ordinarily, this message indicates the termination of the call and gives direction to apply the appropriate treatment. Examples of this treatment are busy, vacant code, unallocated number, etc.

Figure 4A:
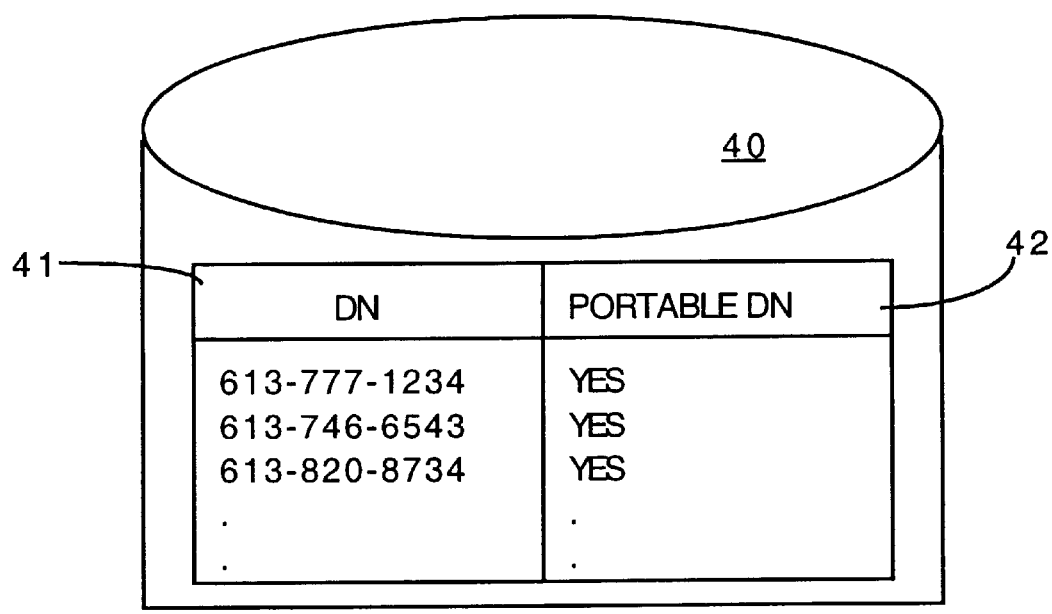
FIG. 4a and 4b are diagrams illustrating database tables for use with the present invention.

As indicated above, portable numbers are anticipated to be numbers currently assigned to a specific office in the North American Numbering Plan (NANP). Where blocks of numbers are assigned to alternate service providers, they would be considered within the NANP and therefore would be routed directly based on the assigned block. Therefore, with each ported number, the terminating exchange must be updated with the information that the number is now portable. With the method of the present invention, number portability is implemented by augmenting the existing Directory Number table with a field to indicate the number is portable. This is shown in FIG. 4a. The internal database 40 at the terminating office is provided with a customer profile which includes, amongst others, a directory number field 41 and a portability field 42. This table can of course be an exclusion table, wherein the presence of the dialled DN indicates number portability.

Figure 3:
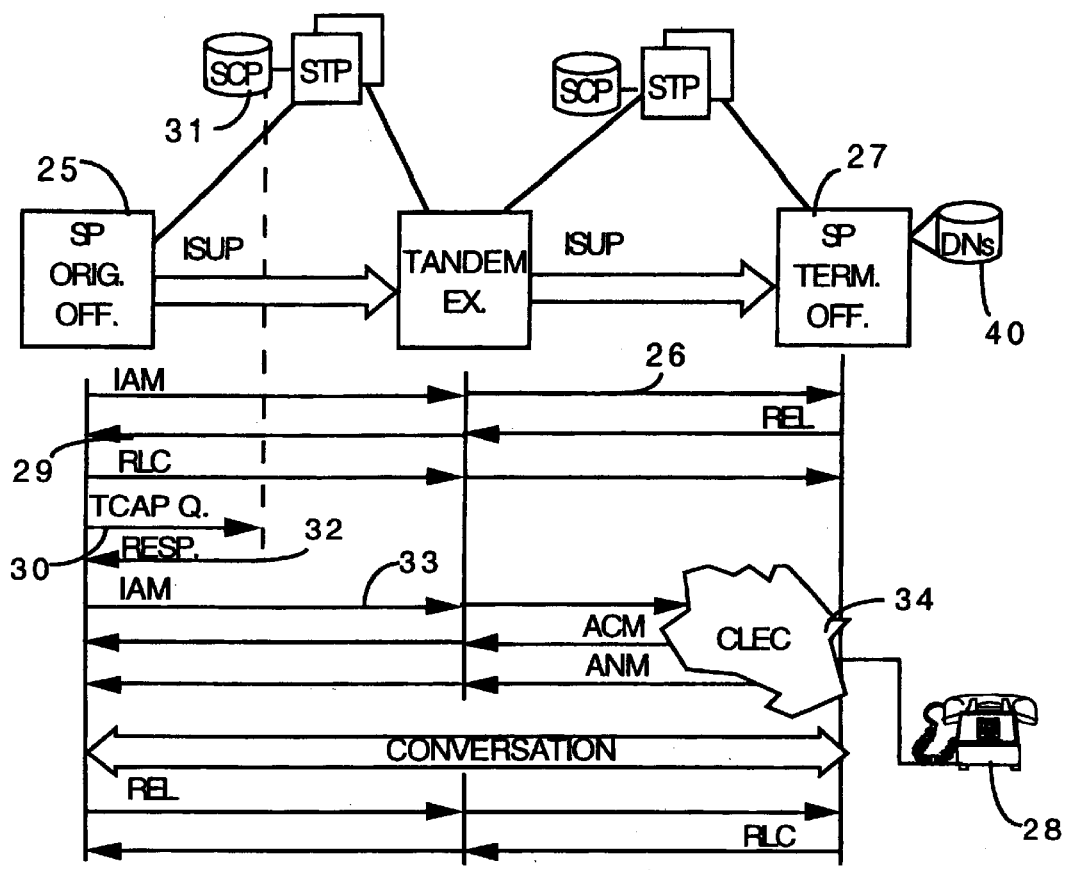
FIG. 3 is a diagram illustrating the signalling call flow for the method of the present invention.
Figure 4B:
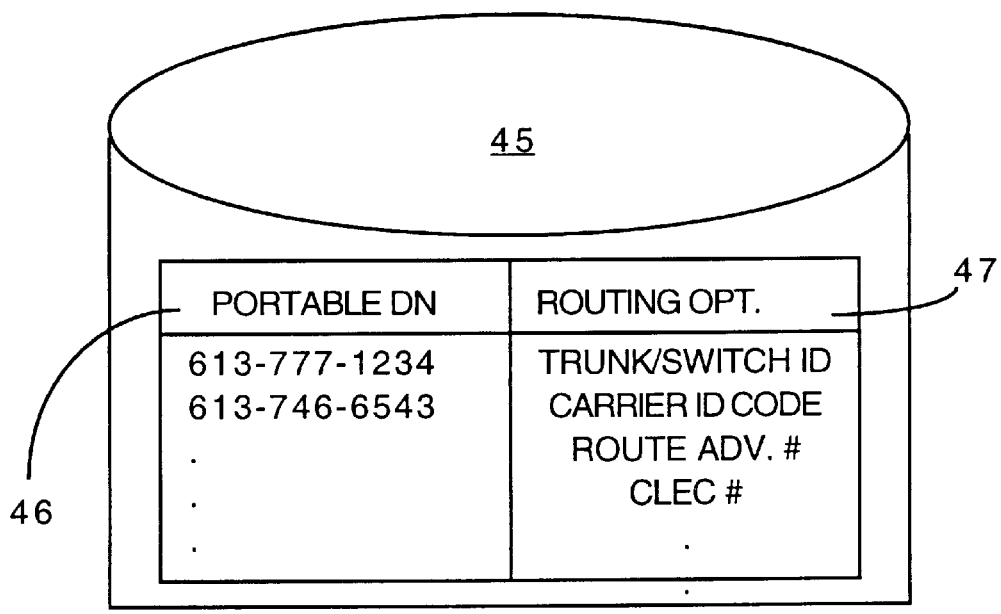

Thus, with reference to FIGS. 3, 4a and 4b, when the call set up is initiated from an originating office 25 and the IAM 26 is received at the terminating office 27, the called party's profile is verified. A determination of whether or not the called party's number is portable can then be made from the directory number table 40 at the terminating office 27. If the called party's number is not portable, the call is routed by terminating office 27 directly to the called party's station. However, if database 40 indicates that the called party 28 makes use of a portable DN, a modified ISUP REL with cause message 29 is returned from the terminating office 27 to the originating office 25, via any intermediate office. The modified REL with cause message 29 contains a new parameter which provides an indication to the originating office 25, or any office which carries the call, that this call is directed to a portable number. Once received at the originating office 25, a TCAP query 30 is launched to SCP 31. SCP 31 contains a database 45, shown in FIG. 4b, which contains a look up table 46 with telephone numbers which are portable. A routing option field 47 enables the translation of the called number to provide new routing information. The routing information need not refer to a number, but can consist of a trunk and switch identification code, carrier identification code, route advance number, CLEC number, etc.

The TCAP query 30 contains the information, such as the called party's number which has been identified as portable. Once the TCAP query 30 is received at SCP 31, a translation provides new routing information from field 47. A response 32 containing the new routing information is received at the originating office 25 from the SCP 31. A new IAM 33 can then be created and sent to the competitive local exchange carrier (CLEC) shown at reference numeral 34. The IAM message 33 contains the necessary information to enable the call to be routed to it's final destination, i.e. called party 28.

Thus, number portability can be accomplished using a modified ISUP message returned from the terminating office for each number considered to be portable. In this example, the release message is divided into several parameters with the cause indicator being used. Although the use of the release with cause message is used in the preferred embodiment of the invention, a message indicative that a dialled number is portable could be accomplished using newly defined ISUP messages or parameters contained in existing ISUP messages.

An example of the release message identification format follows:

| Message Type | Standard & No. | Parameter | Option |
| --- | --- | --- | --- |
| Release | ANSI-T1.113.3 Table 14A | Cause Par 3.9 | Normal Event 0011110 (30) |

The new value is only an example and can be any parameter which is not already being used in the existing standard. The new parameter indicates to any offices which carry the call, that this call is a portable number. Using an adjacent node table, applicable to SS7 signalling, each office can determine, where possible, if the release of the call can take place further back in the chain. Once the call reaches a point where the call cannot be released further, a query is then launched to a database where the call is then give a new address information. Instead of terminating the call at this point, a new address can be applied, forwarding the call to another destination.

Figure 5:
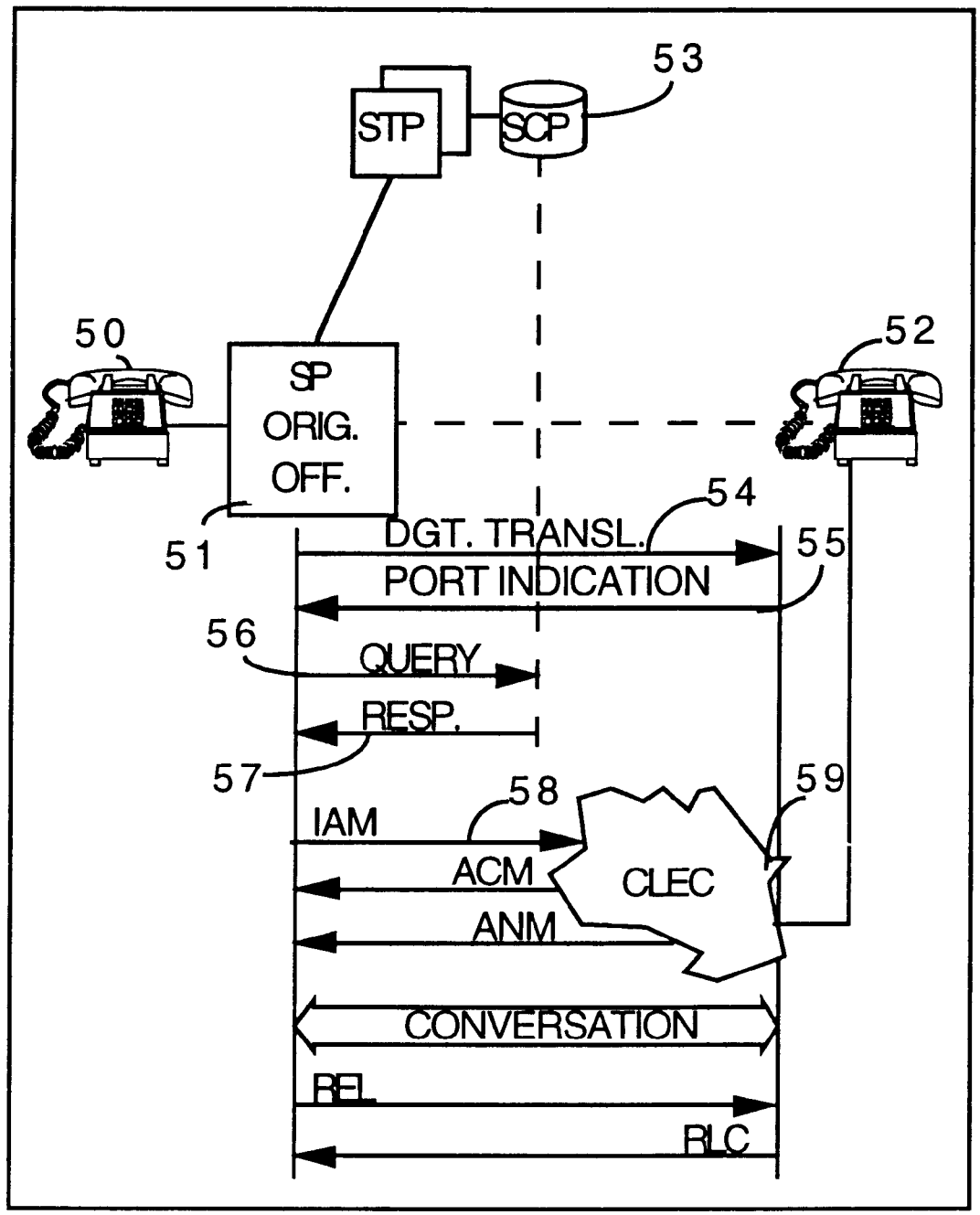

The flow diagram of FIG. 5 illustrates a situation wherein a call from a subscriber 50 on an exchange 51 to a subscriber 52 is also assigned to the same exchange, but wherein the dialled number is a portable number. The call will require a query to a database at SCP 53 to obtain new routing information. When subscriber 50 is placing a call to subscriber 52, the dialled digits 54 will point to the profile of called subscriber 52. The profile indicates a portable number and a port indication 55. A query 56 is launched to SCP 53 and a response 57 with new routing information is provided. Thus, at this point, the call has not left the exchange 51. However, from the new routing information, an IAM 58 is created to route the call to the exchange serving the CLEC 59. The call is then completed as indicated before.

Figure 6:
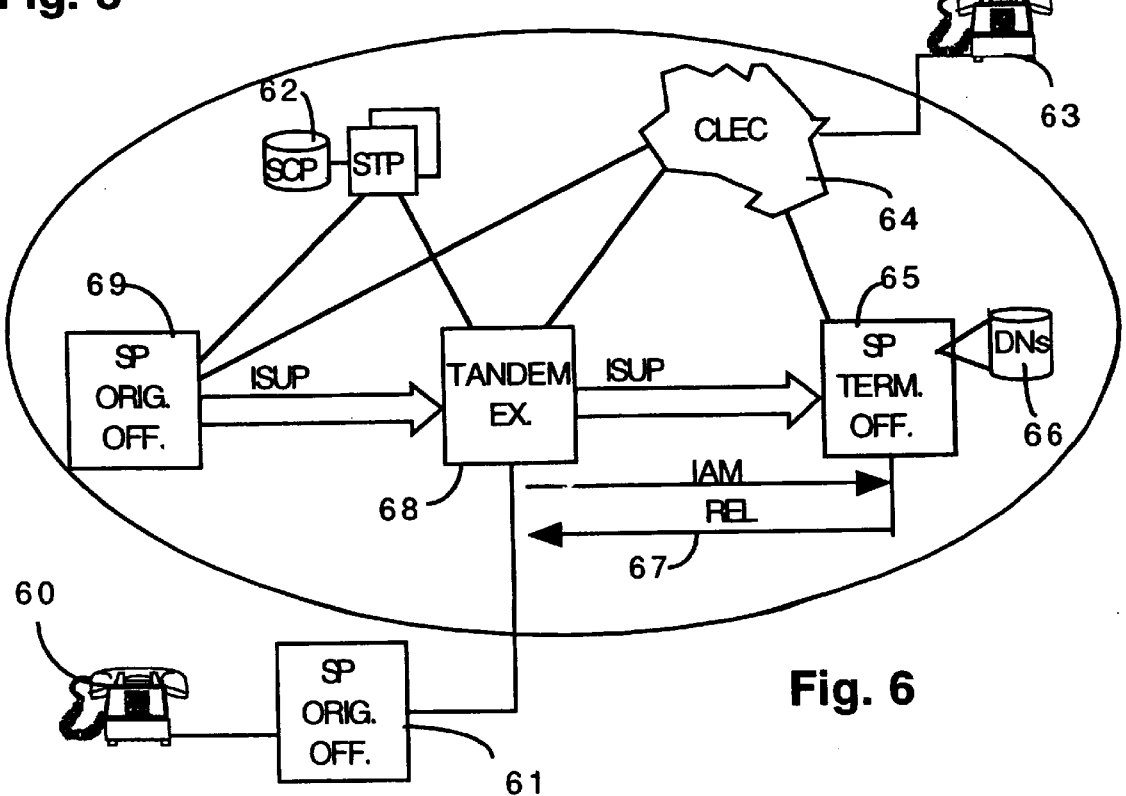
FIGS. 5 and 6 are diagrams illustrating the signalling call flow according to other embodiments of the present invention.

The block diagram of FIG. 6 illustrates a call scenario wherein a calling party 60 is served by a switching office 61 which is unable to support number portability. For example, support for number portability is not available if the switch is an analog exchange or if the switch is unable to query a database, such as SCP 62. Also, even if the exchange is capable of launching a query to an SCP, software may not be resident in that exchange to support number portability.

Accordingly, when calling party 60 attempts to reach a called party 63 which is served by a CLEC 64, the call set-up will be initiated between switching office 61 and terminating office 65 where the dialled number is ported. A directory number table 66, such as shown in FIG. 4a, provides an indication of whether the dialled digits are associated with a portable number.

Thus, once the call set-up signalling data reaches tandem exchange 68 from originating office 61, an IAM containing routing information is forwarded to terminating office 65. If the dialled digits point to a portable number in table 66, then a modified ISUP message 67 is returned to tandem 68. The modified ISUP message contains an indication that the call is directed to a portable number. In this example, the modified ISUP message is a release with cause message. If the call had originated from a calling party served by a switch able to support number portability, i.e. one able to query a database for routing options, such as switch 69, then the ISUP message 67 would return all the way back so the switching office where the call originated, i.e. switch 69. This call scenario was illustrated with reference to FIG. 3.

However, because switch 61, which originated the call, cannot launch a query to SCP 62, for number portability service, the modified ISUP message 67 is returned to the closest office along the signalling path from where the call originated, which supports number portability, i.e. tandem switch 68.

Therefore, in the call scenario illustrated in FIG. 6, the office closest to the originating switch, along the signalling route, which is capable of handling number portability is tandem switch 68. The determination of how far back along the signalling path the modified ISUP message should be returned, is made according to a table, located in each office. This table would identify if the previous office or an adjacent exchange, from which the call originates, supports number portability services.

Once a modified ISUP message 67 is received at tandem exchange 68, a determination is made of whether the modified ISUP message should return further down the signalling path. If no other switches along the path is suitable to support number portability, a database query is launched at that point. Thus, in this scenario, tandem switch 68 launches a query to SCP 62 to obtain the routing options associated with the dialled digits. SCP 62 contains a table such as shown in FIG. 4b. Using the new routing information, a new IAM can then be created at tandem switch 68 to route the call to the called party 63. Database 62 can exist anywhere and need not be located near the exchange. Further, a database can support one or more exchanges as required.

The table of FIG. 4b can include a unique designation for portable numbers within the incumbent LEC network, portable numbers in a competitive local exchange carrier (CLEC) network, and numbers which have moved into another area such as an NPA.

It will thus be seen from the above description, instead of sending a query to a database for each call made in the network, with the method of the present invention, number portability can be provided with the use of IN database queries, but only for those calls that are determined to be portable. This solution therefore provides better use of the network's resources and at the same time, reduces the costs associated with providing number portability.

Variations of the particular embodiment herewith described will be obvious to one skilled in the art, and accordingly the embodiment is to be taken as illustrative rather than limitative, the true scope of the invention being set out in the appended claims.

What is claimed is:

1. A method of enabling the routing of a call to a called party, comprising the steps of:
    (a) forwarding from an originating office a first message containing the called party's number to a terminating office which served the called party's number;
    (b) determining at the terminating office using a table located at the terminating office that the number is a ported number;
    (c) receiving from the terminating office, in response to said first message, a second message containing an indication that the called party's number is associated with a ported number, and
    (d) in response to said second message containing an indication that said called party number is a ported number, querying a database from the originating office to obtain routing information to enable said call to be routed from the originating office to said called party.

2. A method of enabling the routing of a call to a called party, comprising the steps of:
    receiving at a terminating office a first message including a called party's number;
    responsive to said first message, determining whether said called party's number corresponds to a ported number by locating the ported number in a table at the terminating office, the table indicating if the called party number is a ported number, and sending a second message to an originating office for the call, the second message containing an indication that the called party's number is a ported number, the originating office obtaining routing information and using the routing information to complete the call.

3. A system for enabling the routing of a call to a called party, comprising:
    a switching office which forwards a first message containing the called party's number and receives, in response to said first message, a second message containing an indication that the called party's number is a ported number; and
    launching a query to a database if said second message indicates that the called party number is a ported number, to obtain routing information to enable said call to be routed from said switching office to said called party.

4. In a telephone network having a number of telephone switching offices equipped with SSPs (Service Switching Points) operating with IN (Intelligent Network) application software, able to query a remotely located SCP (Service Control Point), when required, to receive SS7 (Signalling System 7) messages from the SSPs to translate a dialled number to enable the routing of a call on the telephone network, a method of providing number portability for the treatment of calls from a calling party to a specific number of a called party, comprising the steps of:
    forwarding an initial Address Message (IAM) from an originating office to a terminating office, said IAM containing the called party's number;
    receiving said IAM at said terminating office and determining from a table at the terminating office whether said called party number is a ported number;
    returning from said terminating office to said originating office, a message containing an indication that the called party number is a ported number, if said call is directed to a ported number;
    receiving said message, at said originating office; and
    launching a query from said originating office to said SCP and receiving a response from the SCP to provide a routing option to enable said call to be routed to said called party from the originating office.

5. A method as defined in claim 4, wherein said message comprises a modified ISUP message.

6. A method as defined in claim 5, wherein said modified ISUP message comprises a release with cause message having a parameter field used for providing an indication that the number dialled is a portable number.

7. A method as defined in claim 6, wherein said call is determined to be directed to a portable number by accessing the called party's profile at an internal database or table at said terminating office to determine whether the called party's number is ported from the terminating office.

8. A method as defined in claim 6, wherein said call is determined to be directed to a portable number by launching a query from said terminating office to a remotely located database and accessing the called party's profile to determine whether the called party's number is ported from the terminating office.

9. A method as defined in claim 7, wherein if the called party's number is ported at the terminating office, a release with cause message parameter is modified in order to launch a query to said SCP, once said modified release message is received at said originating office.

10. A method as defined in claim 4, wherein a query to said SCP is launched from an intermediate office located between said originating and terminating offices as the message containing the indication that the called party number is a ported number is returned from the terminating office if said originating office is determined to be unable to obtain a routing option to enable said call to be routed to said called party.

11. A method as defined in claim 10, wherein a new IAM is created and forwarded from said intermediate office to an alternate terminating office associated with said routing option.

12. A method as defined in claim 11, wherein a determination is made at said intermediate office of whether said originating office is unable to service the call, by querying an adjacent node table indicative of the capability of each switching office adjacent thereto to service said call.

13. A method as defined in claim 12, wherein said adjacent node table is located at each office in said network along a call's signalling path.

14. A method as defined in claim 13, wherein said adjacent node table is queried at each office along said call's signalling path as said message is returned from said terminating office towards said originating office.

15. In a telephone network having a number of telephone switching offices equipped with SSPs (Service Switching Points) operating with IN (Intelligent Network) application software, able to query a remotely located SCP (Service Control Point), when required, to receive SS7 (Signalling System 7) messages from the SSPs to translate a dialled number to enable the routing of a call on the telephone network, a method of providing number portability for the treatment of calls from a calling party to a specific number of a called party, comprising the steps of:

receiving digits dialled by said calling party at a switching office serving said calling party;

establishing a signalling path from said switching office serving said calling party to a terminating office associated with the dialled digits;

receiving an Initial Address Message (IAM) at said terminating office and determining from a table at the terminating office whether said call is directed to a ported number;

creating at said terminating office, a message containing an indication that the called party number is a ported number, if said call is directed to a ported number;

sending said message from said terminating office to said originating switching office along said signalling path;

launching a query from said originating switching office to said SCP to provide a routing option to enable said call to be routed to said called party;

receiving said routing option at said originating switching office; and creating a new IAM at said originating switching office to enable the call to reach the called party.

16. A method as defined in claim 15, wherein said message comprises a modified ISUP message.

17. A method as defined in claim 16, wherein said modified ISUP message comprises a release with cause message having a parameter field used for providing an indication that the number dialled is a portable number.

18. A method as claimed in claim 17, wherein said table at said terminating office for determining whether the called party's number is a ported number identifies the called party's number as ported.

19. A method as claimed in claim 18, wherein if the called party's number is ported, a release with cause message parameter is modified in order to launch a query to said SCP, once said modified release message is received at said originating office.

20. A method as defined in claim 15, wherein a query to said SCP is launched at an intermediate office located between said originating and terminating offices if said originating office is unable to obtain a routing option to enable said call to be routed to said called party.

21. A method as defined in claim 20, wherein a new IAM is created and forwarded from said intermediate office to an alternate terminating office associated with said routing option.

22. A method as claimed in claim 20, wherein a determination is made at said intermediate office of whether said originating office in unable to service the call, by querying an adjacent node table indicative of the capability of each switching office adjacent thereof to service said call.

23. A method as claimed in claim 22, wherein said adjacent node table is located at each office along a call's signalling path.

24. A method as defined in claim 23, wherein said adjacent node table is queried at each office along said call's signalling path as said message is returned from said terminating office towards said serving office.

25. In a telephone network having a number of telephone switching offices equipped with SSPs (Service Switching Points) operating with IN (Intelligent Network) application software, and a remotely located SCP (Service Control Point) adapted to receive, when required, SS7 (Signalling System 7) messages from the SSPs to translate a dialled number to enable the routing of a call on the telephone network, a system for providing number portability for the treatment of calls from a calling party to a specific number of a called party, comprising:

a first switching office for creating an Initial Address Message (IAM), said IAM containing the calling and called parties' numbers to enable said call to reach said called party;

a second switching office connected to said first switching office via a signalling path established for routing said call and for receiving said IAM;

a table at said second switching office for indicating whether said call is directed to a ported number;

means at said second switching office for creating a message containing an indication that the called party number is a ported number, if said call is directed to a ported number;

means for receiving, at said first switching office, said message returned from said second switching office; and database means for receiving a query from said first switching office, if said message contains an indication that said called party is a ported number and for translating said called party number into new routing information, such that when said new routing information is received at said first switching office, a new IAM is forwarded via the network to an alternate terminating office indicated by said new routing information.

26. A system as defined in claim 25, wherein said message comprises a modified ISUP message.

27. A system as defined in claim 26, wherein said modified ISUP message comprises a release with cause message having a parameter field used for providing an indication that the number dialled is a portable number.

28. A system as defined in claim 27, wherein said database means is a remotely located SCP used to access the called party's profile to determine whether the called party's number is ported from the terminating office.

29. A system as defined in claim 25, further comprising an adjacent node table indicative of the capability of each switching office adjacent thereof to service said call.

30. A system as defined in claim 29, wherein said adjacent node table is located at each office in said network along a call's signalling path.

31. A system as defined in claim 30, wherein said adjacent node table is queried at each office along said call's signalling path as said message is returned from said terminating office.

32. In a telephone network having a number of telephone switching offices equipped with SSPs (Service Switching Points) operating with IN (Intelligent Network) application software, and a remotely located SCP_(Service Control Point) adapted to receive, when required, SS7 (Signalling System 7) messages from the SSPs to translate a dialled number to enable the routing of a call on the telephone network, a system for providing number portability for the treatment of calls from a calling party to a specific number of a called party, comprising:

a) a first switching office for receiving digits dialled by said calling part;

b) a second switching office connected to said first switching office via a signalling path established for routing a call associated with the dialled digits, said second switching office receiving an Initial Address Message (IAM);

c) first database means, at said second switching office for determining whether said call is directed to a ported number;

d) means at said second switching office for creating a message containing an indication that the called party number is a ported number, if said call is directed to a ported number;

e) second database means at said second switching office for determining whether a previous switching office along the signalling path is capable of supporting number portability, wherein said modified ISUP message is sent from said second switching office to said previous switching office along said signalling path, if said previous switching office is able to service the call; and f) third database means for receiving a TCAP query from an intermediate switching office if said previous switching office is unable to service the call and if said modified ISUP message contains an indication that said called party number is a ported number, and for translating said called party number to new routing information, such that when said new routing information is received at said intermediate switching office, a new IAM is forwarded to an alternate terminating office associated with said new routing information.

33. A system as defined in claim 32, wherein said first database means is a remotely located SCP used to access the called party's profile to determine whether the called party's number is ported from the second switching office.

34. A system as defined in claim 33, wherein said second database means comprises an adjacent node table indicative of the capability of each switching office adjacent thereof to service said call.

35. A system as defined in claim 34, wherein said adjacent node table is located at each office in said network along a call's signalling path.

36. A system as defined in claim 35, wherein said adjacent node table is queried at each office along said call's signalling path as said message is returned from said second switching office.

* * * * *